Figure 1:
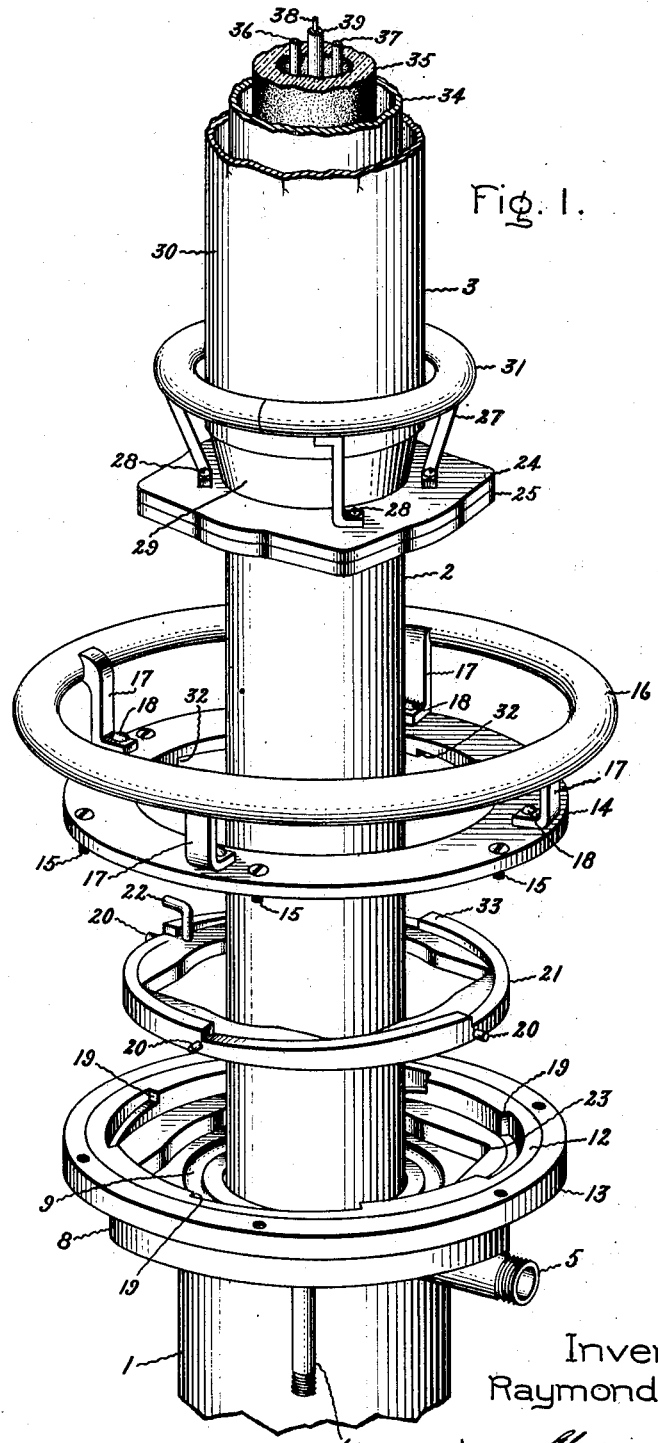

April 13, 1926.

R. B. PRINDLE 1,580,855

COOLING SYSTEM FOR ELECTRICAL DEVICES

Filed April 9, 1925    2 Sheets-Sheet 1

Inventor:
Raymond B. Prindle,
by *Alexander S. Lunt*
His Attorney.

April 13, 1926.
R. B. PRINDLE
1,580,855
COOLING SYSTEM FOR ELECTRICAL DEVICES
Filed April 9, 1925   2 Sheets-Sheet 2
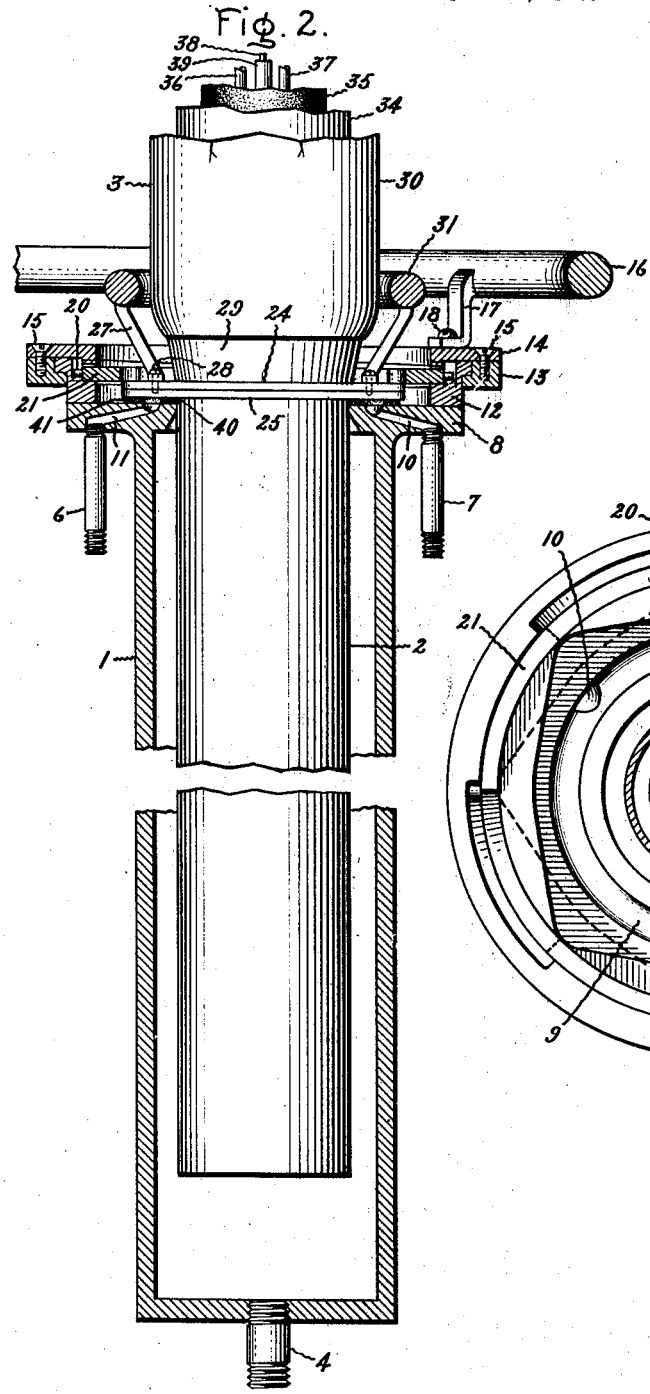
Inventor:
Raymond B. Prindle,
by His Attorney.

Patented Apr. 13, 1926.

1,580,855

UNITED STATES PATENT OFFICE.

RAYMOND B. PRINDLE, OF SCHENECTADY, NEW YORK, ASSIGNOR TO GENERAL ELECTRIC COMPANY, A CORPORATION OF NEW YORK.

COOLING SYSTEM FOR ELECTRICAL DEVICES.

Application filed April 9, 1925. Serial No. 22,003.

*To all whom it may concern:*

Be it known that I, RAYMOND B. PRINDLE, a citizen of the United States, residing at Schenectady, in the county of Schenectady, State of New York, have invented certain new and useful Improvements in Cooling Systems for Electrical Devices, of which the following is a specification.

The present invention relates to improvements in cooling jackets for electrical devices, such as space current devices of large capacity.

According to my invention I provide means whereby the electrical device may be quickly and easily disposed in and removed from the cooling jacket, and which will withstand prolonged operation at relatively high temperatures without damage.

The operation of certain electrical devices such, for example, as space current devices of the type known as "power tubes" is accompanied by the formation of a large amount of heat which must be dissipated in some efficient manner in order to avoid destruction of the device. This is particularly true of power tubes in which one of the electrodes, say the anode, constitutes a portion of the evacuated container and within which other electrodes are disposed in electron responsive relation.

Such devices may be cooled by means of vanes or ribs disposed along the exterior of the device and adapted to radiate the heat. Cooling by means of circulating fluids is, however, more satisfactory and more readily controlled and is generally effected by means of jackets adapted to surround the electrical device or some portion thereof and provided with entry and exit openings for the cooling fluid. The jackets hitherto used, however, while fairly well suited for devices of small size, are awkward to handle when built of any appreciable dimensions and weight. This is due largely to the method used for attaching the jacket to the device, an operation which generally involves the manipulation of screw threads for uniting the flanges and gaskets associated with the jacket. Screw thread flanges are costly to make since they necessitate accurate machine work and have a tendency to jam during manipulation even when the threads are of relatively coarse pitch. The heat evolved, moreover, corrodes the surfaces of the threads and enhances the difficulty experienced in dismantling the various parts, while the application of undue force or jerky manipulation frequently causes damage to the internal structure of the electrical device.

In accordance with the present invention I provide an improved cooling jacket, together with means whereby the electrical device which it is intended to serve may be readily positioned and locked therein and as readily removed therefrom.

The invention itself will best be understood by reference to the following specification, while the novel features of the invention will be pointed out with particularity in the appended claims.

In the drawing in which like numerals of reference designate similar parts in the several views, Fig. 1 shows an exploded view of the details of the upper portion of my improved cooling jacket with a portion of an electrical device shown associated therewith; Fig. 2 shows a cross section of my cooling jacket with a portion of an electrical device mounted therein; and Fig. 3 illustrates a top view of the device showing the operative position of the locking members thereof and the relative position occupied by the electrical device when locked in place.

Referring in detail to the drawing, the cooling jacket of my invention comprises a cylindrical metal chamber 1, within which a portion of the electrical device, e. g. the anode 2 of a power tube 3, is disposed. The cylindrical chamber 1, is provided with a suitable inlet connection 4 (Fig. 2), and outlet pipe 5 (Fig. 1), so arranged that the cold fluid enters at the bottom and passes out at the top after absorbing some of the heat of the anode 2.

The water jacket chamber 1 terminates at its upper end in a flange-like portion or head member 8 which is provided with a circular channel 9 and holes 10, 11, drilled obliquely to meet the inlet and outlet pipes 6 and 7. This arrangement constitutes a second fluid circulatory system of which pipes 6 and 7 in Fig. 2 represent the inlet and outlet openings, only one of these openings being visible in Fig. 1. The function of this system is to cool the flanges of the electrical device independently of the body of the same, as will be hereinafter more fully described.

Disposed above the flange 8 and suitably secured thereto by screws which are not shown is a circular member 12 which may, if desired, be built as an integral portion of flange 8. The member 12 is chamfered at its external periphery to receive a ring member 13, as is shown in Fig. 2. A top annular plate 14 is in turn secured to the member 13 by means of screws 15. An operating handle 16 in the shape of a ring is secured to member 14 by angle pieces 17 and screws 18.

It will be observed from Fig. 1, that member 12 is provided with a plurality of internally extending ratchet-like ramps 19 which co-act with studs 20 disposed in the periphery of an annular member 21. This annular member 21 is adapted to fit freely within member 12 and is itself provided with ratchet-like ramps similar to those carried by member 12 but disposed upon its upper surface while the inside opening is approximately square with rounded corners similar and symmetrical to flanges 24 and 25 hereinafter described. A finger piece 22 is secured to the member 21 to aid in positioning member 21 when the same is placed within 12. Disposed on the bottom of member 14 and adapted to co-act with the ramp teeth of member 21 are a number of similar ramps 32 (Fig. 1). The inside opening of member 12 is also substantially square, and is provided with rounded corners 23.

The upper part of the exploded view of Fig. 1 shows a portion of a typical power tube and is arranged to illustrate the functioning of the locking scheme associated with the jacket. The anode 2 terminates at its upper portion in a flange composed of two similarly shaped members 24 and 25, suitably united as by soldering. The under portion of the lower member 25 of the flange may be provided with a circular channel, so as to co-act with a similar channel disposed in member 8 and indicated by 9 in Fig. 1. Two concentric gaskets 40 and 41 of suitable material, say lead, are provided so that when the two channels are superposed the system will, with the inlet and outlet pipes 6 and 7 of Fig. 2, constitute the flange cooling circulatory system hereinbefore mentioned. In the example of power tube shown in Fig. 1, the anode flange is shown as square in shape with rounded corners and rounded projections in the center of the sides, but it will be appreciated that while this constitutes a preferred shape of flange, any other shape may be used, provided, of course, that the openings in members 21 and 8 are shaped to correspond.

The glass superstructure 30 of the electrical device may be attached to the flange and to the anode body 2 by means well known to the art, e. g., by means of a sealing cone 29.

The arrangement of the internal structure of the electrical device does not relate to the present invention, although in order to indicate the operative nature of the device shown in the drawing it may be remarked that 34 indicates the prolongation of the anode 2, 35 the quartz insulating member, 36, 37 cathode leads, and 38 a grid lead encased in a quartz tube 39.

In order to facilitate handling of the electrical device during its positioning in the water jacket, a handle 31 may be provided and attached to the composite flange 24 by means of angle pieces 27 and screws 28.

The operation of the device is as follows:

Assuming that the parts shown in the exploded view of Fig. 1 are assembled so as to occupy the position shown in cross section in Fig. 2, it will be evident that member 21 will fit snugly inside of member 12, while flange 14 will rest upon flange 13 and will be united to the latter by screws. The square opening of member 21 must, of course, be made to coincide with the square opening of member 12, whereupon the electrical device is lowered into the jacket by means of handle 31 so that the composite square flange 24, 25 reposes snugly within the square receptacle or opening of member 12. Member 21 may then be rotated by means of finger piece 22 until the studs 20 engage with the shoulder of the internally extending ramps 19 of member 12. This will bring the bottom of member 21 flush against the top of the flange 24 but with the square opening of member 21 occupying the position indicated by the dotted lines in Fig. 3 with respect to the flange 24. Upon now rotating flange 14 by means of handle 16, the ratchet or ramp 32 located on the under side of flange 14 will be caused to mount the ratchet like ramps 33 disposed on the top of member 21 and inasmuch as flange 14 is secured to flange 13 and since the latter is rotatably mounted on member 12 as shown in Fig. 2, the effect will be to tighten the member 21 against the flanges 24, 25. A suitable gasket (not shown) should preferably be used between the channeled underportion of flange 25 and the bed portion of member 8.

The electrical device will thus be held securely locked within the jacket. The body of the anode 2 or other portion of the power tube reposing within the tubular section 1 of the jacket will be cooled by the fluid circulating between openings 4 and 5, while the flange will be cooled separately and apart therefrom by the circulatory system comprehended by channel 9 cooperating with a similar channel on the bottom of flange 25 and openings 10 and 11 associated with pipes 6 and 7.

By connecting the inlet openings of the two circulatory systems or by supplying each system independently and simultaneously with circulating cooling fluid, both the flange and the body of the space current device may be cooled at one time. During actual operation of the device, this is the preferred procedure, but during the process of evacuation it may be preferable to run the metal body of the device at an elevated temperature so as to "bake" the metal parts and to free them from occluded gases. In such a case the main circulatory system may be cut off, leaving only the flange cooling system in operation to protect the seals.

In order to remove the electrical device from its cooling jacket it is merely necessary to reverse the above described series of operations. The handle 16 is turned, carrying with it the flange 14, thus causing the ramps 32 disposed on the bottom thereof to slide down upon and become loose on the co-acting ramps 33 disposed upon the upper portion of the member 21. Rotation is continued by means of handle 16 until studs 20 of member 21 stop against the heel of the internally extending ramp 19 integral with member 12, which will place the square openings of members 12 and 21 in alignment, whereupon the electrical device may be lifted bodily from the jacket by means of operating handle 31.

One of the advantages of the locking system above described resides in the ease with which the electrical device may be positioned within the cooling jacket and removed therefrom. Another advantage resides in the uniform distribution of the pressure exerted upon flange 24 and by means of which its lower member 25 is pressed against the gaskets and the channeled portion of member 8 so that leakage is avoided at the channel 9. Furthermore, the uniform distribution of pressure obviates the production of unequally distributed strains in the flanges 24, 25 and their transmittal to the seal 29 and glass member 30.

The construction of cooling jacket hereinbefore described and particularly the use of the supplementary flange cooling system obviates the necessity of soldering or brazing coils to various parts of the exterior of the electrical device, e. g., at the seals. Such coils, which are intended to cool isolated portions of the device, are difficult to attach and destroy the symmetry of the finished device since they constitute irregular protuberances upon the exterior of the metal body.

What I claim as new and desire to secure by Letters Patent of the United States is:—

1. A cooling system for an electrical device comprising a casing, clamping means associated with said casing for retaining said device therein, a fluid circulatory system for cooling the portion of said device disposed within said casing and a supplementary independent fluid circulatory system for cooling the portion of said device retained by said clamping means.

2. A cooling system for an electrical device having a body portion and a flange, comprising a casing member adapted to surround the body portion of said electrical device, a clamping system associated with the upper portion of said casing member and adapted to engage the flange system of said device and to retain the body portion thereof immovable within said casing, a fluid circulatory system associated with said casing for cooling the body portion of the electrical device enclosed therein and a second fluid circulatory system associated with said clamping system and adapted to cool the flange of said electrical device independently of the body portion.

3. A cooling system for an electrical device having a body portion and a flange, comprising a casing adapted to surround the body portion of said device, a fluid circulatory system for said casing adapted to cool the said body portion, said casing having a flange-like extremity adapted to co-act with the flange on said electrical device, said flange-like extremity being provided with a fluid circulatory cooling system independent of the fluid circulatory system of said casing and means associated with said flange-like extremity for retaining the body portion of said device within said casing and the flange of said device in operative relation with the fluid circulatory cooling system of said flange-like extremity.

4. A clamping system for rigidly supporting flanged electrical devices comprising a plurality of loosely superposed rotatable flange members provided with ratchet-like ramps on their co-acting surfaces, said ramps being so distributed as to produce uniformly distributed pressure upon the flange of an electrical device disposed intermediate said members when said members are rotated in pressure producing direction.

5. A clamping system for a flanged electrical device comprising a head member having a flange-like shape, a non-circular recess therein for accommodating the flange of said electrical device, an annular member rotatably disposed above said recess, said member having an opening of substantially the same shape as the recess of said head member, means for rotating said annular member to bring both recesses in a position to prevent withdrawal of the electrical device, means for limiting the rotation of said annular member, ramps upon the upper surface of said annular member, a rotatable flange disposed above said annular member, said flange having ramps on its lower surface adapted to co-act with the ramps on the annular member, the co-action of said ramps designed to cause the lower surface of the flange of the electrical device to engage in uniformly distributed contact with the upper surface of the flange-like head member.

6. A clamping system for a flanged electrical device comprising a head member having a flange-like shape, a non-circular recess therein for accommodating the flange of said electrical device, a channel disposed in said head member and adapted to supply circulating cooling fluid thereto, an annular member rotatably disposed above said recess, said member having an opening of substantially the same shape as the recess of said head member, means for rotating said annular member to bring both recesses in a position to prevent withdrawal of the electrical device, means for limiting the rotation of said annular member, ramps upon the upper surface of said annular member, a rotatable flange disposed above said annular member, said flange having ramps upon its lower surface adapted to co-act with the ramps on the annular member, the co-action of said ramps being designed to cause the lower surface of the flange of the electrical device to engage in uniformly distributed contact with the upper surface of the flange-like head member and in operative relation with the cooling channel disposed in said head member.

7. A cooling system for an electrical device having a body portion and a flange, comprising a casing adapted to enclose said body portion, a fluid circulatory system associated with said casing and adapted to cool said body portion, said casing terminating in a flange-like extremity adapted to receive and co-act with the flange of said device, a fluid circulatory cooling system associated with said flange-like extremity and adapted to cool the flange of said device independently of the body portion, and means associated with said extremity for applying a uniformly distributed pressure upon the flange of said device to retain said flange in contact with the flange-like extremity of said casing.

In witness whereof, I have hereunto set my hand this 7th day of April, 1925.

RAYMOND B. PRINDLE.